(12) United States Patent
De Oliveira Junior et al.

(10) Patent No.: US 12,325,517 B2
(45) Date of Patent: Jun. 10, 2025

(54) ACCESS COVER PANEL ASSEMBLIES ESPECIALLY USEFUL TO COVER AIRCRAFT FUEL TANK ACCESS OPENINGS

(71) Applicant: EMBRAER S.A., São José dos Campos (BR)

(72) Inventors: Valdir José Augusto De Oliveira Junior, São José dos Campos (BR); Odair Corá, São José dos Campos (BR)

(73) Assignee: EMBRAER S.A., São José Dos Campos (BR)

( * ) Notice: Subject to any disclaimer, the term of this patent is extended or adjusted under 35 U.S.C. 154(b) by 17 days.

(21) Appl. No.: 18/313,668

(22) Filed: May 8, 2023

(65) Prior Publication Data

US 2024/0375762 A1 Nov. 14, 2024

(51) Int. Cl.
*B64C 3/26* (2006.01)
*B64C 3/34* (2006.01)

(52) U.S. Cl.
CPC . *B64C 3/26* (2013.01); *B64C 3/34* (2013.01)

(58) Field of Classification Search
CPC .................................. B64C 3/34; B64C 1/14
See application file for complete search history.

(56) References Cited

U.S. PATENT DOCUMENTS

2009/0294591 A1\* 12/2009 Ramirez Blanco ....... B64C 3/34
244/129.4

FOREIGN PATENT DOCUMENTS

EP          3998193 A1    5/2022
WO       2017072298 A1    5/2017

\* cited by examiner

*Primary Examiner* — Philip J Bonzell
*Assistant Examiner* — Eric Acosta
(74) *Attorney, Agent, or Firm* — Nixon & Vanderhye P.C.

(57) ABSTRACT

Access cover panel assemblies are provided that are especially useful to cover access openings of aircraft wing fuel tanks and include an inner cover plate and an outer cover plate spaced from the inner cover plate which defines a circumferentially spaced-apart plurality of apertures. A circumferentially spaced-apart plurality of generally U-shaped floating nut plates dependently extend from the inner cover plate toward the outer cover plate with each nut plate being in alignment with a respective one of the apertures. A corresponding plurality of attachment bolts extend through each of the apertures of the outer cover plate and are threadably coupled to a respective one of the floating nut plates to thereby removably secure the inner and outer cover plates to one another and to the surrounding structure defining the access opening.

14 Claims, 6 Drawing Sheets

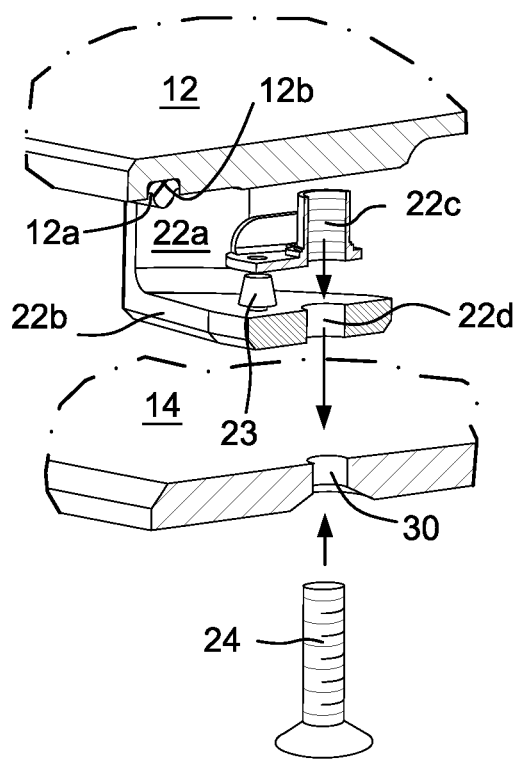 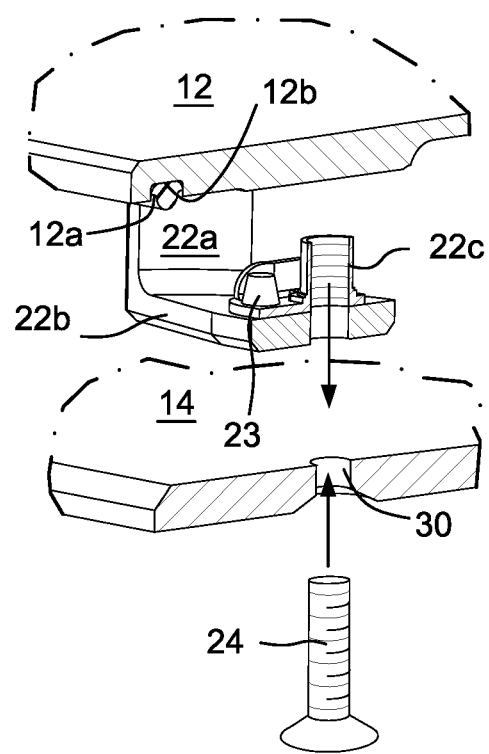
FIG. 7A      FIG. 7B

ACCESS COVER PANEL ASSEMBLIES ESPECIALLY USEFUL TO COVER AIRCRAFT FUEL TANK ACCESS OPENINGS

FIELD

The embodiments disclosed herein relate generally to access cover panel assemblies for covering access openings. In preferred forms, the embodiments disclosed herein relate to access panel cover assemblies that are usefully employed to cover access openings to the fuel tanks of a commercial aircraft wing.

BACKGROUND

Most all commercial aircraft have so-called wet wings whereby portions of the internal wing structure are utilized as on-board fuel tanks to store fuel for the aircraft engines. Access openings are thus typically provided at one or more locations in the skin of the aircraft wing (usually on the bottom surface of the wing) to allow periodic inspection and/or maintenance of the fuel tank. It is of course self-evident that these access openings must be covered with an access panel that is sealed against fuel leakage during aircraft operations.

Various access panel assemblies have been introduced and employed on commercial aircraft. For example, a dish-shaped access cover panel has been provided which is held in position by a series of bolt and nut assemblies associated with an annular sealing ring. Multi-panel access covers have also been proposed whereby inner and outer panel covers are attached to one another by way of through bolt and nut assemblies. In other forms, the inner access cover plate may include a series of protruding threaded posts which allow the outer access cover plate to be attached via a corresponding series of bolts. Other proposals exist in the art, such as those provided by WO 2017/072298 and EP 3998193.

While the various proposals noted above are suitable for their intended uses, there is still a need for improvements. It is therefore toward providing improvements to access panel cover assemblies for covering access openings, especially access panel cover assemblies that are usefully employed to cover access openings to the fuel tanks of a commercial aircraft wing.

SUMMARY

Broadly, the disclosed embodiments herein are directed toward access cover panel assemblies that are especially useful to cover access openings of aircraft wing fuel tanks. According to the embodiments disclosed herein the access cover panel assemblies include an inner cover plate and an outer cover plate spaced from the inner cover plate which defines a circumferentially spaced-apart plurality of apertures. A circumferentially spaced-apart plurality of generally U-shaped floating nut plates dependently extend from the inner cover plate toward the outer cover plate with each nut plate being in alignment with a respective one of the apertures. A corresponding plurality of attachment bolts extend through each of the apertures of the outer cover plate and are threadably coupled to a respective one of the floating nut plates to thereby removably secure the inner and outer cover plates to one another and to the surrounding structure defining the access opening.

The floating nut plates may comprise a pair of circumferentially spaced-apart support legs having an upper end rigidly joined to the inner cover plate and a planar nut plate which bridges the support legs so as to be structurally connected with lower terminal ends thereof. Threaded nuts may each be fixed to and carried by respective upper surfaces of the planar nut plate. The planar nut plates will thus include an opening to allow respective attachment bolts to extend therethrough and be threadably coupled to the threaded nuts. According to certain embodiments it is preferred that the planar nut plates establish a gap with an opposed inner perimetrical surface region of the outer cover plate.

The inner cover plate may include an O-ring seal positioned at an outer perimetrical surface region of the inner cover plate so as to provide a liquid seal with surrounding structure defining the access opening when the access cover panel assembly is installed. The inner cover plate may therefore include an annular recess formed in the outer perimetrical surface region of the inner cover plate, and wherein the O-ring seal is positioned within the annular recess.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

FIGS. 7A and 7B are sequential assembly views of a representative portion of the access panel cover assembly in accordance with the invention.

DETAILED DESCRIPTION

Figure 1:
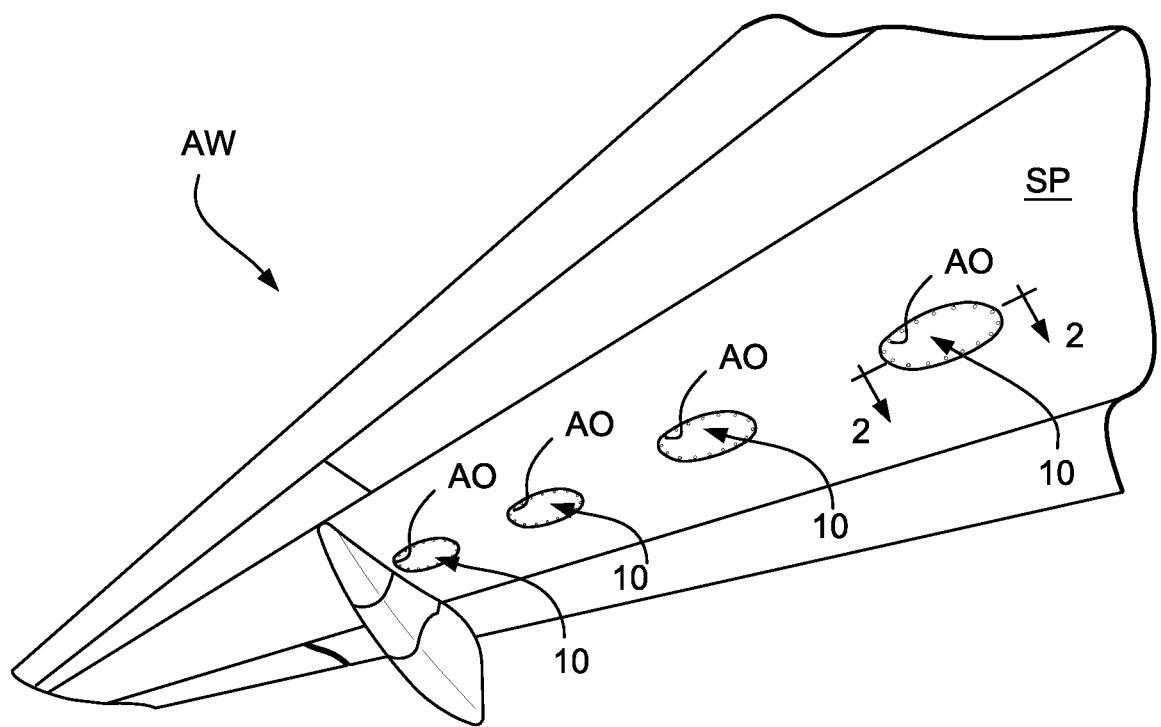
FIG. 1 is a perspective view of an aircraft wing having access panel cover assemblies in accordance with the embodiments disclosed herein on a lower surface thereof so as to cover and seal access openings to the internal wing fuel tanks of the aircraft.

As is shown in FIG. 1, an aircraft wing AW is provided with a series of access openings AO that are covered by respective access panel assemblies 10 in accordance with an embodiment of the present invention. Preferably, the access openings AO and hence the access panel assemblies 10 are located in the bottom skin panels SP of the aircraft wing AW. Each access panel assembly 10 will include planar inner and outer cover plates 12, 14, respectively. The shape of the access openings AO and hence the shape of the inner and outer cover plates 12, 14, respectively, is not criticial but it is usually preferred that oval, elliptical or similar non-circular shapes be employed as such shapes allow the removal of the inner cover plate 12 through its respective the access opening AO upon dissassembly.

Figure 2:
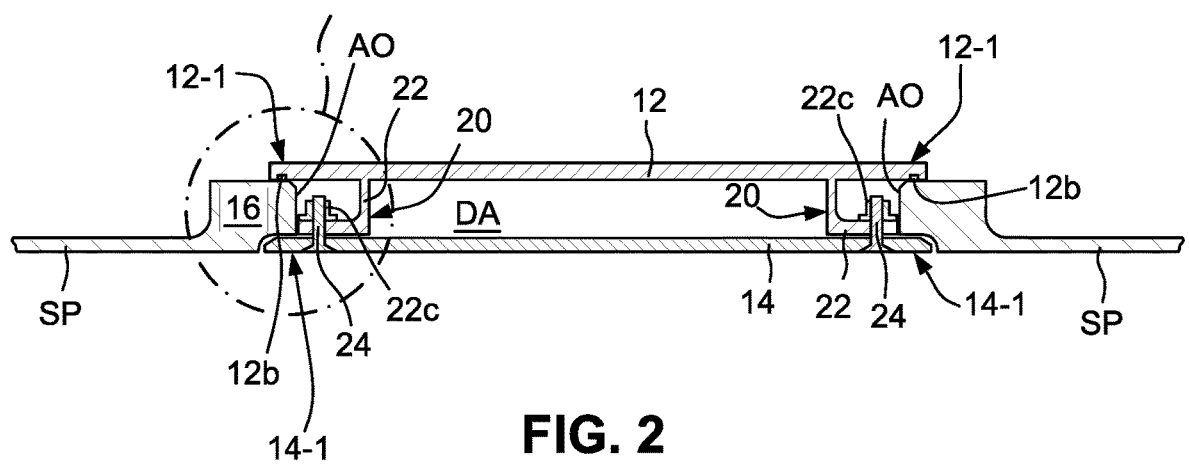
FIG. 2 is an enlarged cross-sectional elevational view of the access opening and its associated access panel assembly for the aircraft wing fuel tank as taken along line 2-2 in FIG. 1.
Figure 3:
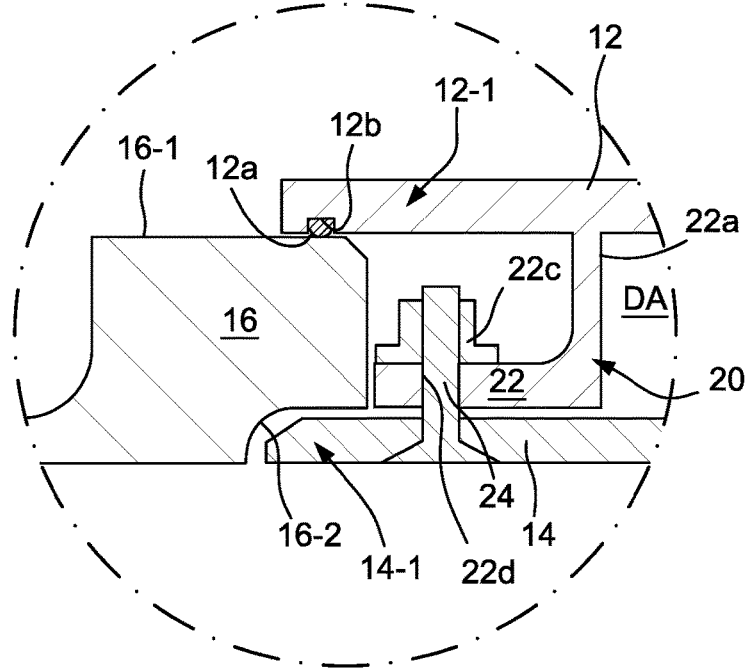
FIG. 3 is an enlarged view of a peripheral edge region of the access panel assembly shown in FIG. 2.
Figure 4:
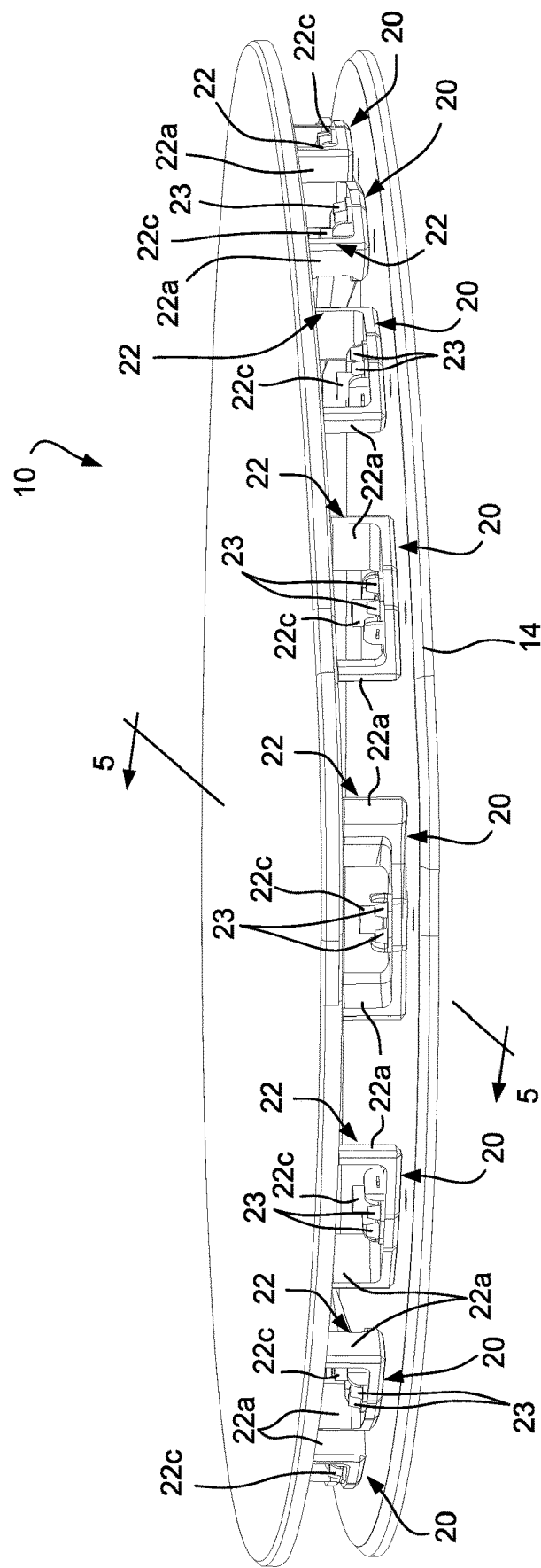
FIG. 4 is a perspective view of an exemplary access panel cover assembly in accordance with an embodiment of this invention.
Figures 5, 5A:
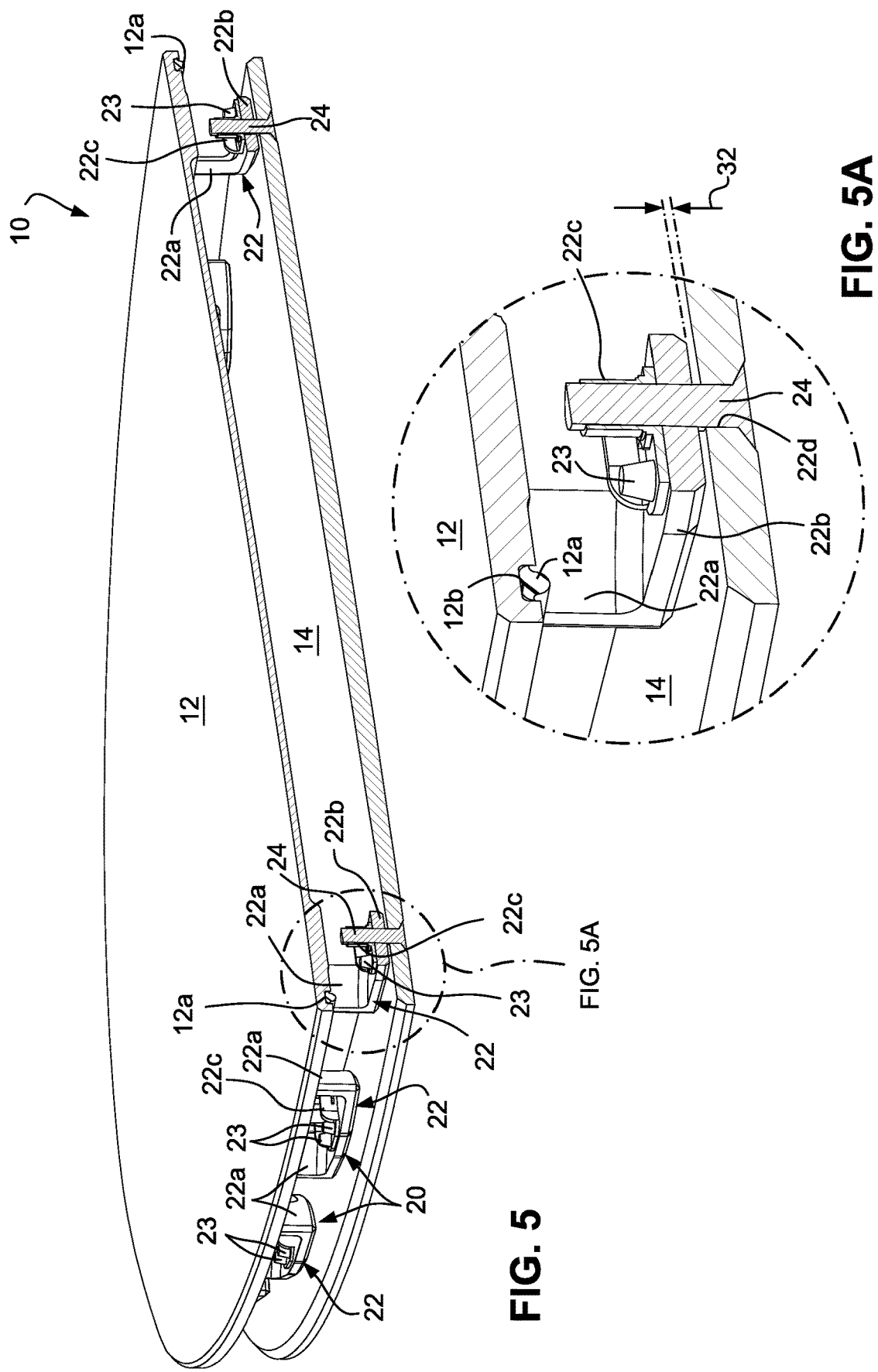
FIG. 5 is a cross-sectional elevational view of the access panel cover assembly shown in FIG. 4 as taken along line 5-5 therein.
FIG. 5A is an enlarged cross-sectional view of a portion of the access panel cover assembly shown in FIG. 5.

As is perhaps better shown in FIGS. 2 and 3, the inner cover plate 12 is sized and configured such that the outer peripheral edge region 12-1 thereof is in sealing engagement with an inner surface 16-1 of the lip structure 16 defining the access opening AO in the skin panel SP of the aircraft wing AW. In the embodiment shown, the inner cover plate 12 will preferably carry an elastomeric O-ring seal 12a within a perimetrical annular recess 12b formed in the lower surface of the outer peripheral edge region 12-1 thereof so as to provide a fluid-tight seal against the inner surface 16-1 of the lip structure 16 when the access panel assembly 10 is installed in the aircraft wing AW. The space defend between the inner and outer cover plates 12, 14, respectively, will therefore be a dry area DA which is free of fuel. The peripheral edge region 14-1 of the outer cover plate 14 will preferably be received in a correspondingly configured cove surface 16-2 of the lip structure 16 so as to be substantially flush with the skin panels SP of the aircraft wing AW when the access panel assembly 10 is installed therein.

As is perhaps more clearly depicted in FIGS. 4-6 and 7A-7B, the inner cover plate 12 is provided with a plurality of floating nut plate assemblies 20 that are circumferentially spaced apart from one another about the peripheral edge region 12-1 thereof. Each floating nut plate assembly 20 will preferably include a one-piece U-shaped nut plate body 22 which is rigidly joined to a lower surface of the inner cover plate 12 so as to dependently project therefrom. The nut plate body 22 is comprised of a pair of circumferentially spaced-apart support legs 22a and a planar nut plate 22b which bridges the support legs 22a so as to be structurally connected with the lower terminal ends thereof. Each nut plate 22b carries a threaded nut 22c which is fixed to an upper surface of the nut plate 22b, e.g., via rivets 23. An opening 22d is provided in the nut plate 22b to allow a threaded shaft of a bolt 24 to be inserted therethrough and be threadably engaged with the nut 22c (see e.g., FIG. 6).

Figure 6:
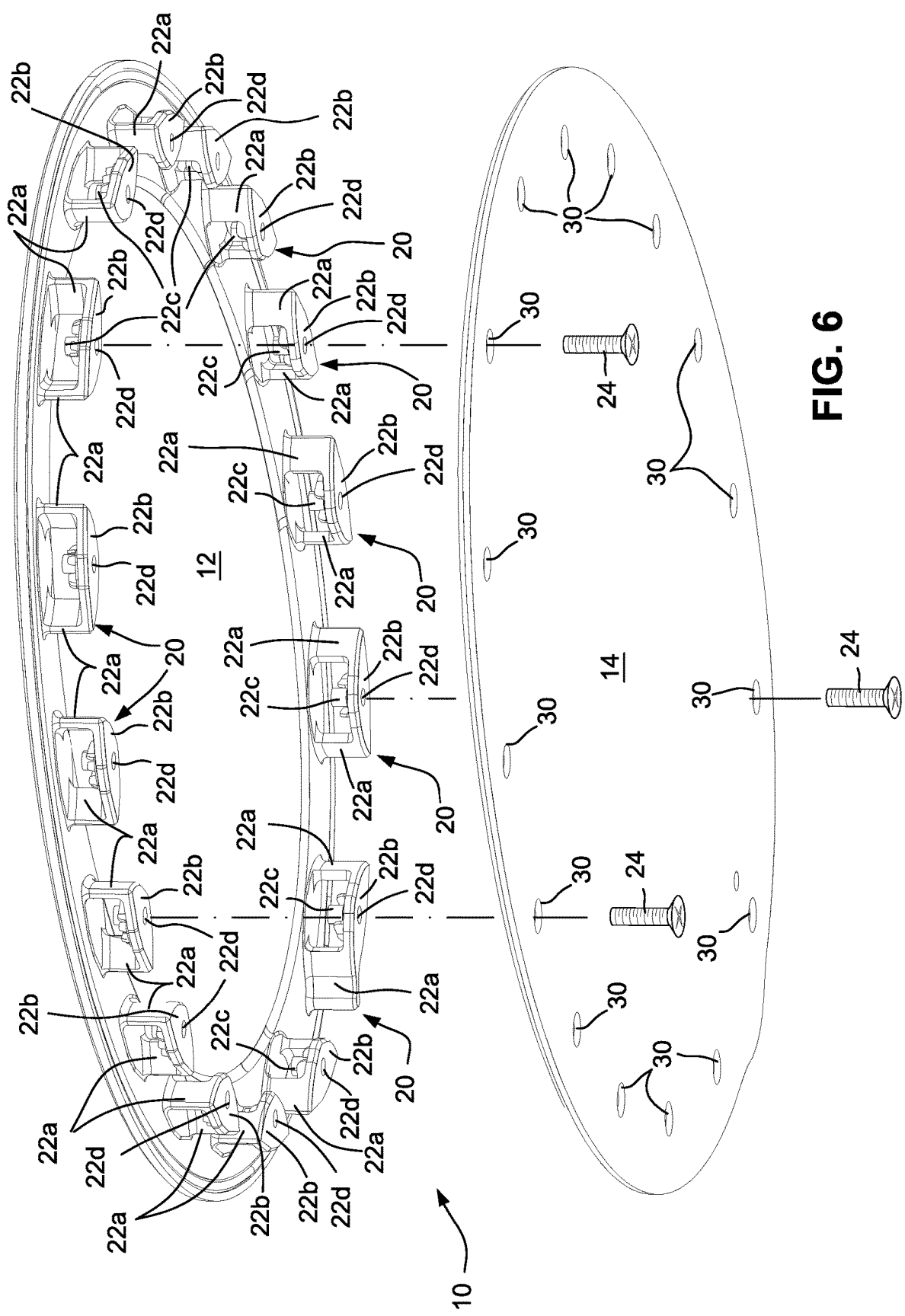
FIG. 6 is an exploded perspective view of the access panel cover assembly shown in FIG. 5.

The outer cover plate 14 will have a series of countersunk apertures 30 that are circumferentially spaced apart about its peripheral edge region 14-1 and positioned so as to be in alignment with a corresponding one of the openings 22d associated with a respective nut plate 22b of the nut plate body (see FIGS. 6 and 7A-7B). The threaded shaft of the bolt 24 will therefore be inserted through a respective one of the apertures 30 and pass through the opening 22d associated with a respective on of the nut plates 22b so it can be threadably engaged with the fixed-position nut 22c on the upper surface of the nut plate 22b. Upon threaded tightening of the bolt 24, therefore, the inner and outer cover plates 12, 14 will be drawn towards one another thereby causing compressive engagement between the O-ring seal 12a associated with the peripheral edge region 12-1 of the inner cover plate 12 and the respective opposing surface 16-1 of the the lip structure 16. It is preferred in this regard that the U-shaped nut plate body 22 be sized so that a slight gap 32 exists between the nut plate 22b and the opposed perimetrical inner surface region of the outer cover plate 14 (see e.g., FIG. 5A).

In use, the inner cover plate 12 will be manipulated so as to be inserted into the access opening AO of the aircraft wing AW and positioned so its perimetrical edge region 12-1 rests on the upper surface 16-1 of the lip structure 16. Thereafter the outer cover plate 14 can be positioned so that the apertures 30 thereof are aligned with a respective one of the openings 22d defined in the nut plate 22b of an associated one of the floating nut plates 22. Thereafter, the bolts 24 can be inserted through the apertures 30 and threadably engaged with the respective nut 22c fixed to the correspondingly aligned nut plate 22b. Threaded tightening of the bolts 24 within the nuts 22c will therefore exert a compressive force between the peripheral edge region 12-1 of the inner cover plates 12 and the opposed inner surface 16-1 of the lip structure 16. As a result of such compressive force, the O-ring seal 12a of the cover plate 12 will be sealingly engaged with the upper surface 16-1 of the lip structure 16 thereby sealing the peripheral edge region 12-1 of the inner cover plate 12 against fuel leakage. Following drainage of fuel from the associated fuel tank, the dissassembly of the inner and outer cover plates 12, 14, respectively, relative to the access opening AO can proceed in the reverse order to that described above so as to allow inspection and/or maintenance of the fuel tank.

Various modifications within the skill of those in the art may be envisioned. Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. An access cover panel assembly comprising:
   an inner cover plate;
   an outer cover plate spaced from the inner cover plate defining a circumferentially spaced-apart plurality of apertures,
   a circumferentially spaced-apart plurality of floating nut plate assemblies, and
   a plurality of attachment bolts extending through each of the apertures of the outer cover plate and threadably coupled to a respective one of the floating nut plate assemblies to removably secure the inner and outer cover plates to one another, wherein
   each of the floating nut plate assemblies includes a one-piece U-shaped nut plate body comprised of:
   (i) a pair of circumferentially spaced-apart support legs having opposed first and second ends, wherein the first end of each of the support legs is rigidly joined to a lower surface of the inner cover plate and thereby dependently extend from the inner cover plate toward the outer cover plate, and
   (ii) a planar nut plate which is structurally connected to and thereby bridges the second ends of each of the support legs, wherein
   (iii) the planar nut plate is in alignment with a respective one of the apertures defined by the outer cover plate and is adapted to threadably receive a respective one of the attachments bolts extending therethrough.

2. The access cover panel assembly according to claim 1, further comprising threaded nuts each fixed to and carried by respective upper surfaces of the planar nut plates.

3. The access cover panel assembly according to claim 2, wherein the planar nut plates include an opening to allow the respective one of the attachment bolts to extend therethrough and be threadably coupled to the threaded nuts.

4. The access cover panel assembly according to claim 1, wherein each planar nut plate establishes a gap with an opposed inner perimetrical surface region of the outer cover plate.

5. The access cover panel assembly according to claim 1, wherein the inner cover plate includes an O-ring seal positioned at an outer peripheral edge region thereof.

6. The access cover panel assembly according to claim 5, wherein the inner cover plate includes an annular recess formed in the outer peripheral edge region of the inner cover plate, and wherein the O-ring seal is positioned within the annular recess.

7. An aircraft wing comprising:

an internal fuel tank;

a lip structure defining an access opening through an external skin of the wing to allow access to the fuel tank, and a cover plate assembly removably connected to and covering the access opening in the wing, wherein the cover plate assembly comprises:

(a) an inner cover plate;

(b) an outer cover plate spaced from the inner cover plate defining a circumferentially spaced-apart plurality of apertures, (c) a plurality of circumferentially spaced-apart floating nut plate assemblies, and (d) a plurality of attachment bolts extending through each of the apertures of the outer cover plate and threadably coupled to a respective one of the floating nut plate assemblies to removably secure the inner and outer cover plates to one another and to exert a compressive force onto a surface of the lip structure, wherein each of the floating nut plate assemblies includes a one-piece U-shaped nut plate body comprised of:

(i) a pair of circumferentially spaced-apart support legs having opposed first and second ends, wherein the first end of each of the support legs is rigidly joined to a lower surface of the inner cover plate and thereby dependently extend from the inner cover plate toward the outer cover plate, and (ii) a planar nut plate which is structurally connected to and (ii) thereby bridges the second ends of each of the support legs, wherein (iii) the planar nut plate is in alignment with a respective one of the apertures defined by the outer cover plate and is adapted to threadably receive a respective one of the attachments bolts extending therethrough.

8. The aircraft wing according to claim 7, further comprising threaded nuts each fixed to and carried by respective upper surfaces of the planar nut plates.

9. The aircraft wing according to claim 8, wherein each planar nut plate of the nut plate assemblies includes an opening to allow respective attachment bolts to extend therethrough and be threadably coupled to the threaded nuts.

10. The aircraft wing according to claim 7, wherein each planar nut plate establishes a gap with an opposed peripheral edge region of the outer cover plate.

11. The aircraft wing according to claim 7, wherein the inner cover plate includes an O-ring seal positioned at a peripheral edge region of the inner cover plate.

12. The aircraft wing according to claim 11, wherein the inner cover plate includes an annular recess formed in the peripheral edge region of the inner cover plate, and wherein the O-ring seal is positioned within the annular recess.

13. The aircraft wing according to claim 12, wherein the O-ring seal is sealingly compressed against an opposed surface of the lip structure defining the access opening in the external skin of the aircraft wing.

14. An aircraft which comprises the aircraft wing according to claim 7.

* * * * *